United States Patent
Cili et al.

(10) Patent No.: US 9,420,480 B2
(45) Date of Patent: Aug. 16, 2016

(54) FAST SCAN ALGORITHM FOR HIGHER PRIORITY SERVICE SEARCH

(71) Applicant: Apple Inc., Cupertino, CA (US)

(72) Inventors: Gencer Cili, Cupertino, CA (US); Sairam T. S. Gutta, Cupertino, CA (US); Qi He, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 81 days.

(21) Appl. No.: 13/947,928

(22) Filed: Jul. 22, 2013

(65) Prior Publication Data

US 2015/0023184 A1    Jan. 22, 2015

(51) Int. Cl.
| | | |
|---|---|---|
| *H04W 4/00* | (2009.01) | |
| *H04W 24/08* | (2009.01) | |
| *H04W 48/16* | (2009.01) | |
| *H04W 76/00* | (2009.01) | |

(52) U.S. Cl.
CPC .............. *H04W 24/08* (2013.01); *H04W 48/16* (2013.01); *H04W 76/00* (2013.01)

(58) Field of Classification Search
USPC .................. 370/252, 328, 331, 352; 455/436
See application file for complete search history.

(56) References Cited

U.S. PATENT DOCUMENTS

| | | | |
|---|---|---|---|
| 8,667,513 B1* | 3/2014 | Shah ................ | H04W 52/0206 719/328 |
| 8,832,777 B2* | 9/2014 | Raleigh et al. .................... | 726/1 |
| 2012/0218889 A1* | 8/2012 | Watfa et al. ................... | 370/230 |
| 2013/0053013 A1* | 2/2013 | Giaretta et al. ............... | 455/418 |
| 2013/0070728 A1* | 3/2013 | Umatt et al. .................. | 370/331 |
| 2013/0142169 A1* | 6/2013 | Kulakov et al. ............... | 370/331 |
| 2013/0189987 A1* | 7/2013 | Klingenbrunn et al. ....... | 455/436 |
| 2013/0225145 A1* | 8/2013 | Cherian et al. ................ | 455/418 |
| 2013/0288718 A1* | 10/2013 | MacGougan et al. ..... | 455/456.4 |
| 2013/0316725 A1* | 11/2013 | MacGougan et al. ..... | 455/456.1 |
| 2013/0324124 A1* | 12/2013 | Scribano et al. ........... | 455/435.3 |
| 2014/0018079 A1* | 1/2014 | Xing et al. .................... | 455/437 |
| 2014/0112223 A1* | 4/2014 | Swann et al. ................. | 370/311 |
| 2014/0247730 A1* | 9/2014 | Thota et al. ................... | 370/252 |

* cited by examiner

*Primary Examiner* — Kwang B Yao
*Assistant Examiner* — Nguyen Ngo
(74) *Attorney, Agent, or Firm* — Meyertons, Hood, Kivlin, Kowert & Goetzel, P.C.

(57) ABSTRACT

In a wireless communication system, techniques and devices are presented that can perform fast scan algorithms from a lower priority service, e.g., following a circuit-switched fallback (CSFB) voice call, to search for a higher priority network or technology to select. The higher priority network might be an LTE technology network or a high priority PLMN.

17 Claims, 8 Drawing Sheets

FAST SCAN ALGORITHM FOR HIGHER PRIORITY SERVICE SEARCH

BACKGROUND

1. Field of the Application

The disclosure is directed to wireless communications and, more particularly, to fast scan algorithms for higher priority network or technology search in wireless communications.

2. Background of the Disclosure

Wireless communication systems are widely deployed to provide various communication services, such as: voice, video, packet data, circuit-switched info, broadcast, messaging services, and so on. A typical wireless communication system, or network, can provide multiple users access to one or more shared resources (e.g., bandwidth, transmit power, etc.). These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and so on.

Multi-access systems can be implemented via any number of radio access technologies (RATs) as defined in various network standards, such as Global System for Mobile Communications (GSM), Universal Mobile Telecommunication System (UMTS) and 3GPP Long Term Evolution (LTE). GSM and UMTS can be considered prior generation technologies and began as circuit switched (CS) systems. Generally, a CS network connection requires dedicated, point-to-point switches to establish the connection. LTE can be considered a more current generation of technology and is a packet switched (PS) system. Generally, a PS network does not require a dedicated, point-to-point connection, but instead a message gets broken into small blocks, or packets, each of which being able seek out the most efficient transfer route to the destination (i.e., each packet could take a different route to the destination). Usually, each current generation technology might be considered a higher priority technology than the prior generation (or generations) it replaces. For example, UMTS (as a third generation technology) might be considered a high priority technology than GSM (as a second generation technology), and LTE (as a fourth generation technology) might be considered a higher priority than either UMTS or GSM.

As new generations of wireless technology are rolled out, the prior generations and the current generations will co-exist for a period of time. Initially, LTE has been implemented for data transfer only, without voice capability (i.e., without an IP multimedia subsystem for voice over IP capability). Thus, an LTE-capable handset (HS) or mobile device must fall back (FB) to a previous generation RAT, such as GSM or UMTS, to make a voice call. Using CSFB, an LTE HS can make voice calls by reverting to traditional circuit switched communications.

Once a CSFB call has ended, the HS might be in a state that allows one or more applications (Apps) on the device to start or return to transferring data traffic while still on the lower priority network or technology, instead of first switching to a faster, more efficient or higher priority technology or network. For example, if the CSFB call is a UMTS call, once the call ends, the device might be in the UMTS cell-DCH ("dedicated channel") or cell-FACH ("forward access channel") state. While the mobile device is in either of these UMTS states, it may not scan for an LTE technology or a higher priority network, such as a high priority public land mobile network (PLMN), either of which might provide a user of the HS a faster and/or more efficient data traffic experience. Additionally, a mobile device might be connected (i.e., with an active radio link) in a lower priority network for any other reason, such as when roaming. In this situation, the device might be in a data traffic transfer state for one or more applications (Apps) that does not allow the device to scan for a higher priority technology or network, which might provide the user with a faster and/or more efficient data traffic experience.

Because there are more and more mobile device applications using data traffic, devices are likely to stay in or alternate between states on a lower priority technology or network for a long time and thus not switch back to a higher priority network or technology. Sometimes, the HS user may not even realize what is happening, because the data traffic could be initiated by one or more applications (Apps) running in the background of the device, potentially causing unnecessary delay in finding a higher priority technology or network.

Therefore, what are needed are techniques for fast scan for higher priority network or technology networks.

DETAILED DESCRIPTION

The following detailed description is directed to certain sample embodiments. However, the disclosure can be embodied in a multitude of different ways as defined and covered by the claims. In this description, reference is made to the drawings wherein like parts are designated with like reference numerals within this application.

This disclosure makes reference to various wireless communication devices, such as access point, mobile device, handset, base station, user equipment, Node B, access terminal, eNB and the like. The use of these and other names that may be associated with specific technologies or standards is not intended to indicate or mandate one particular device, one particular standard or protocol, or one particular signaling direction and is expressly intended to not be limiting of the scope of this application in any way. The use of these and other names is strictly for convenience and such names may be interchanged within this application without any loss of coverage or rights.

Various techniques described herein can be used for various wireless communication systems, technologies and/or networks, such as Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication technique employing the teachings herein may be designed to implement one or more standards, such as IS-95, cdma2000, IS-856, W-CDMA, TDSCDMA, GSM, UMTS, LTE, WiFi, WiMAX and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11 ("WiFi"), IEEE 802.16 "(WiMAX"), IEEE 802.20 ("MBWA"), Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17, and so on) technology, as well as 3GPP2 (1xRTT, 1xEV-DO Re10, RevA, RevB, and so on) technology and other technologies, such as WiFi, WiMAX, WMBA and the like.

Figure 1:
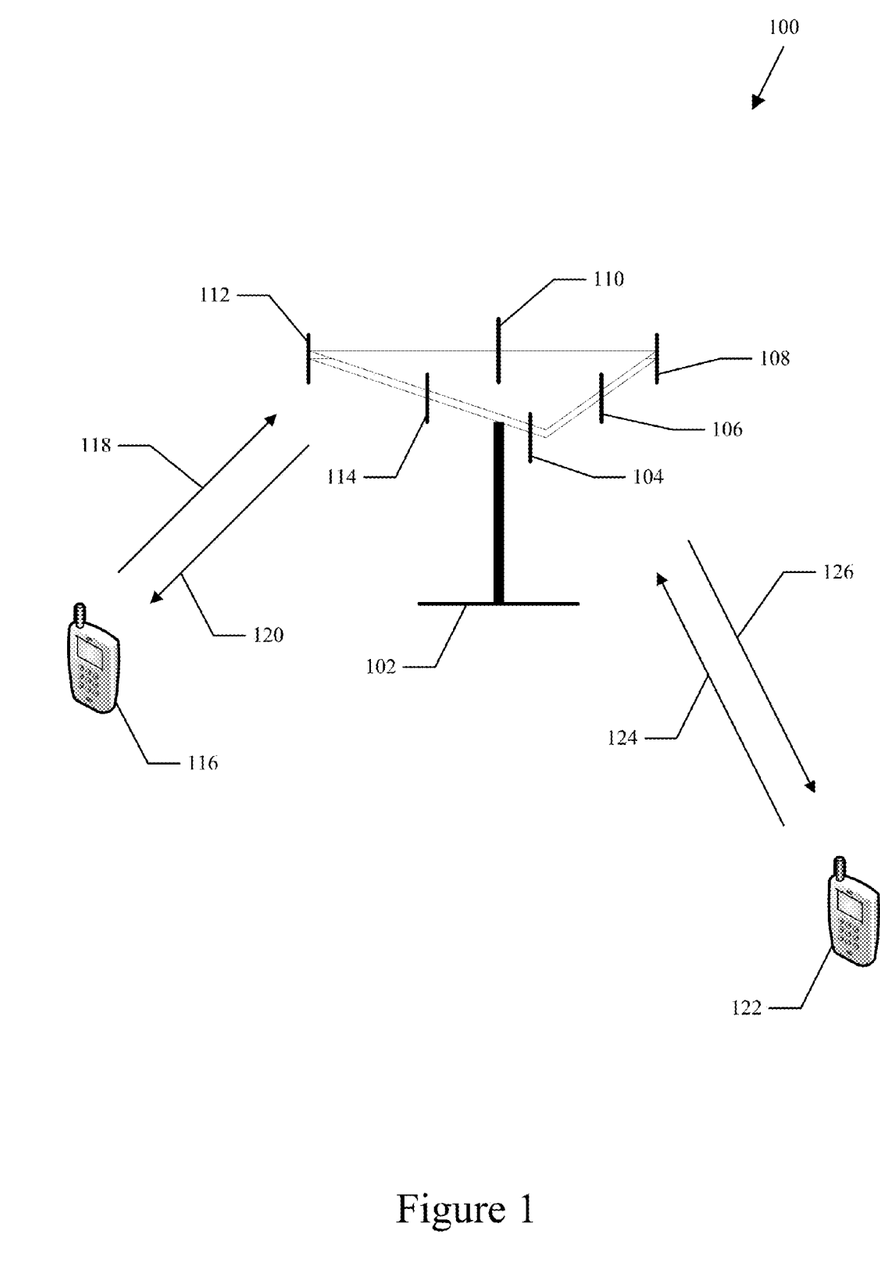
FIG. 1 illustrates an exemplary wireless multiple-access communication system according to certain embodiments.

Referring to the drawings, FIG. 1 illustrates an exemplary wireless multiple-access communication system 100 according to certain embodiments. As shown in FIG. 1, an enhanced Node B (eNB) base station 102 includes multiple antenna groups. One antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. As shown, user equipment (UE) 116 can be in communication with antennas 112 and 114, where antennas 112 and 114 transmit information to UE 116 over downlink (or forward link) 120 and receive information from UE 116 over uplink (or reverse link) 118. Additionally and/or alternatively, UE 122 can be in communication with antennas 104 and 106, where antennas 104 and 106 transmit information to UE 122 over downlink 126 and receive information from UE 122 over uplink 124. In a frequency division duplex (FDD) system, communication links 118, 120, 124 and 126 can use different frequencies for communication. In time division duplex (TDD) systems, communication links 118, 120, 124 and 126 can use the same frequency or frequencies for communication, but can communicate at differing times.

Each group of antennas and/or the area in which they are designed to communicate can be referred to as a sector of the eNB or base station. In accordance with one aspect, antenna groups can be designed to communicate to mobile devices in a sector of areas (not shown) covered by eNB 102. In communication over downlinks 120 and 126, the transmitting antennas of eNB 102 can utilize beamforming in order to improve the signal-to-noise ratio of downlinks for the different UEs 116 and 122. Also, a base station using beamforming to transmit to UEs scattered randomly through its coverage area can cause less interference to mobile devices in neighboring cells or sectors than a base station transmitting through a single antenna to all of its UEs. In addition to beamforming, antenna groups of a base station, as well as mobile devices, can use other multi-antenna or antenna diversity techniques to send and/or receive information, such as spatial multiplexing, spatial diversity, pattern diversity, polarization diversity, transmit/receive diversity, adaptive arrays, and the like.

Figure 2:
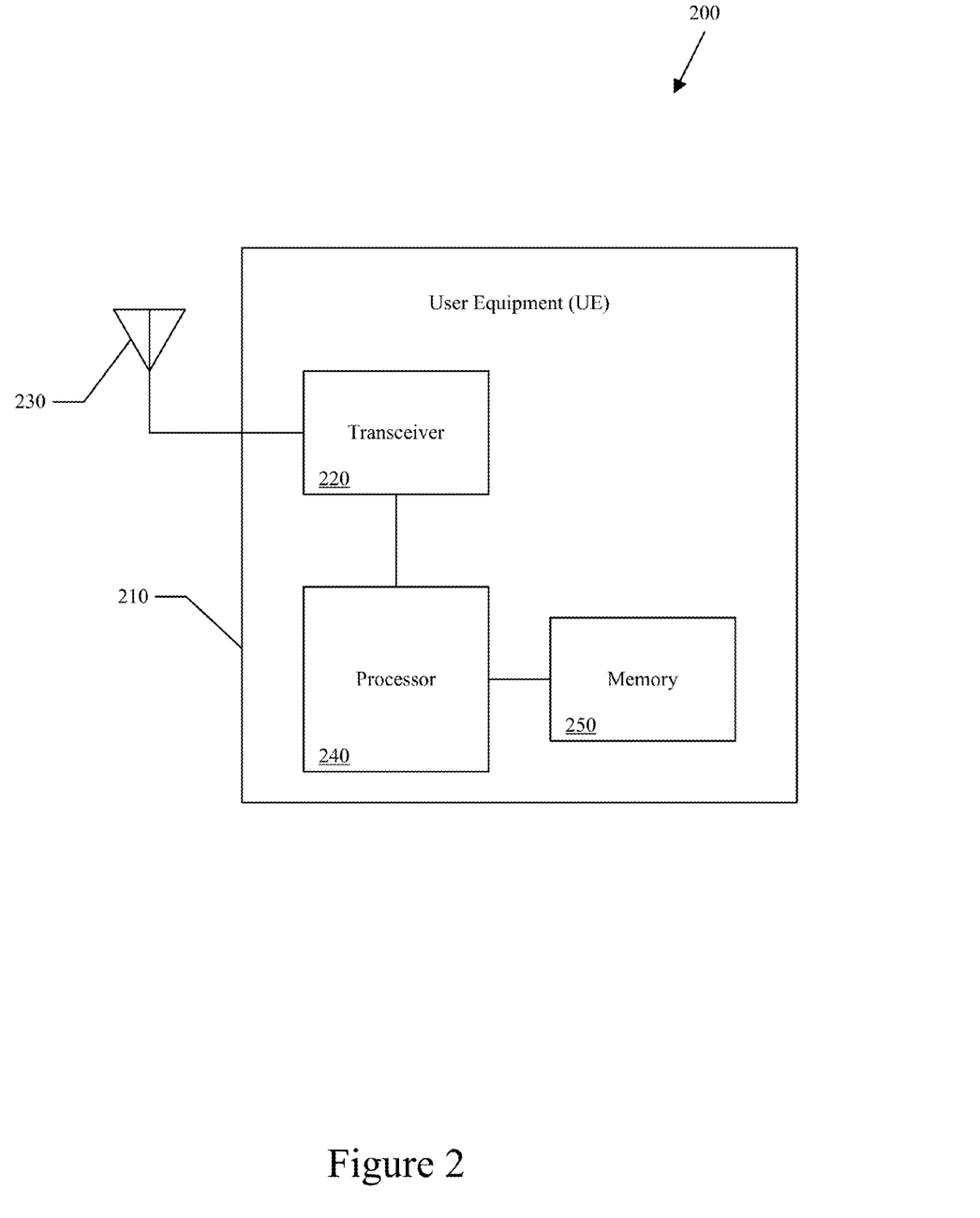
FIG. 2 illustrates a block diagram of an exemplary mobile device, handset (HS) or user equipment (UE) according to certain embodiments.

FIG. 2 illustrates a block diagram 200 of an exemplary mobile device, handset (HS) or user equipment (UE) 210 according to certain embodiments. As shown in FIG. 2, UE 210 may include a transceiver 220, an antenna 230, a processor 240, and a memory 250 (which, in certain embodiments, may include memory in a Subscriber Identity Module (SIM) card). In certain embodiments, some or all of the functionalities described herein as being performed by a handset or mobile device may be provided by processor 240 executing instructions stored on a computer-readable medium, such as the memory 250, as shown in FIG. 2. Alternatively, processor 240 and/or memory 250 may be one or more separate processors and/or memories. Additionally, UE 210 may perform uplink and/or downlink communication functions, as further disclosed herein, via transceiver 220 and antenna 230. While only one antenna and one transceiver are shown for UE 210, certain embodiments are equally applicable to multi-antenna and/or multi-transceiver mobile devices. In certain embodiments, UE 210 may include additional components beyond those shown in FIG. 2 that may be responsible for enabling or performing the functions of UE 210, such as communicating with a base station in a network and for processing information for transmitting or from reception, including any of the functionality described herein. Such additional components are not shown in FIG. 2 but are intended to be within the scope of coverage of this application.

Figure 3:
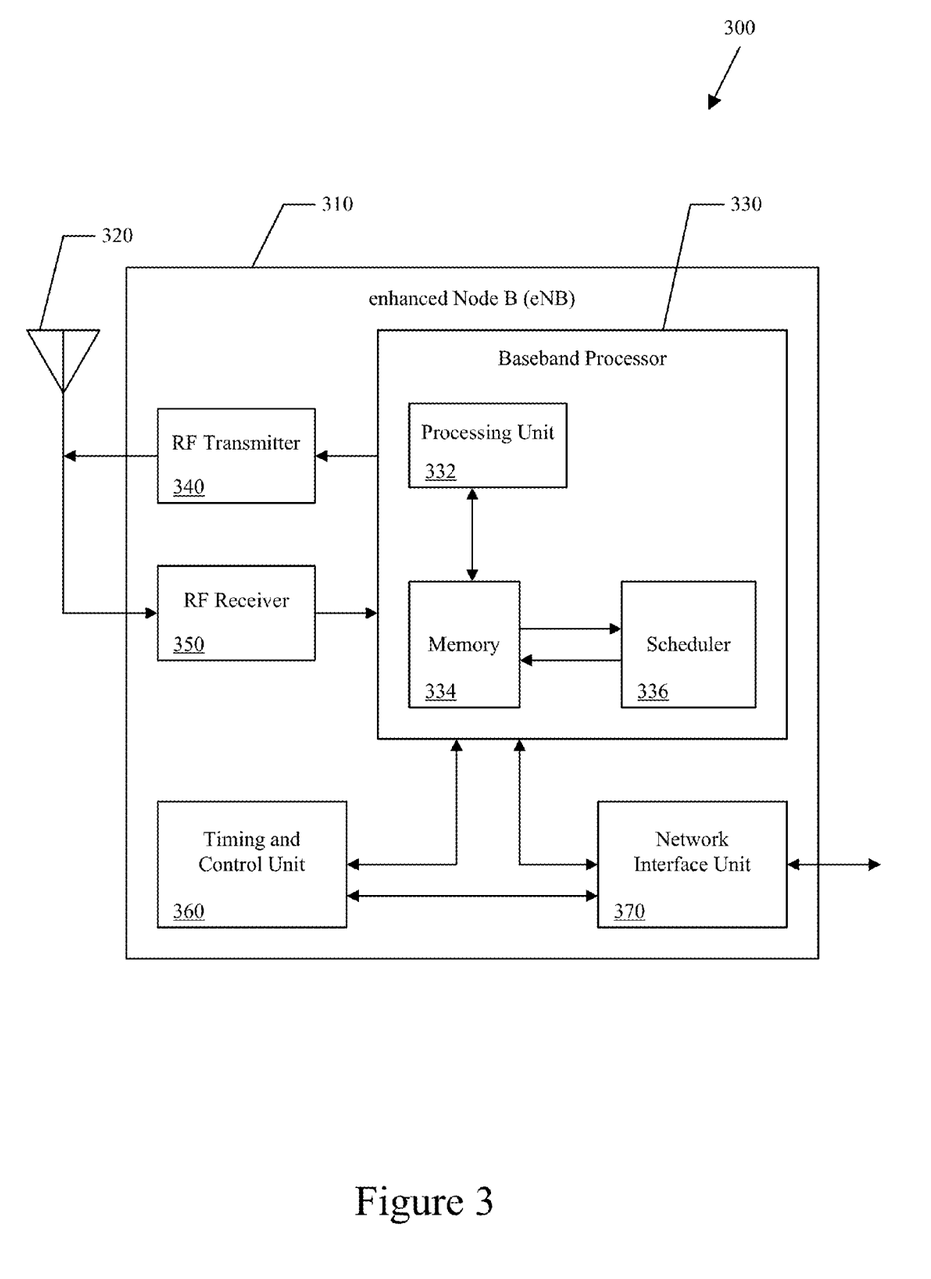
FIG. 3 illustrates a block diagram of an exemplary enhanced Node B (eNB) or similar mobile communication node (e.g., base station, access point, etc.) according to certain embodiments.

FIG. 3 illustrates a block diagram 300 of an exemplary enhanced Node B (eNB) 310 or similar mobile communication node (e.g., base station, access point, etc.) according to certain embodiments. As shown in FIG. 3, eNB 310 may include a baseband processor 330 to provide radio communication with mobile handsets via a radio frequency (RF) transmitter 340 and RF receiver 350 units coupled to eNB antenna 320. While only one antenna and one transceiver set are shown, certain embodiments are applicable to multi-antenna and/or multi-transceiver set configurations. RF transmitter 340 and RF receiver 350 may be combined into one, transceiver unit, and/or duplicated to facilitate multiple antenna communication. Baseband processor 330 may be configured (in hardware and/or software) to function according to a wireless communications standard, such as 3GPP LTE. Alternatively, multiple baseband processors may be included in eNB 310. Baseband processor 330 may include a processing unit 332 in communication with a memory 334 to process and store relevant information for the eNB and a scheduler 336, which may provide scheduling decisions for mobile devices serviced by eNB 310. Scheduler 336 may have some or all of the same data structure as a typical scheduler for an eNB in an LTE system. Alternatively, processing unit 332 and/or memory 334 may be one or more separate processors and/or memories. In certain embodiments, some or all of the functionalities described herein as being performed by an enhanced Node B, access point or base station may be provided by processing unit 332 executing instructions stored on a computer-readable medium, such as memory 334, as shown in FIG. 3.

Baseband processor 330 may also provide additional baseband signal processing (e.g., mobile device registration, channel signal information calculation and/or transmission, radio resource management, etc.) as required. Processing unit 332 may include, by way of example, one or more of the following: a general purpose processor, a special purpose processor, a conventional processor, a digital signal processor (DSP), a microprocessor, a microprocessor in association with a DSP core, a controller, a microcontroller, an Application Specific Integrated Circuits (ASICs), Field Programmable Gate Arrays (FPGAs) circuits, and any other type of integrated circuit (IC) and/or state machine. Some or all of the functionalities described herein as being provided by a mobile base station, a base station controller, a node B, an enhanced node B, an access point, a home base station, a femtocell base station, and/or any other type of mobile communications node may be provided by processing unit 332 executing instructions stored on a computer-readable data storage medium, such as the memory 334 shown in FIG. 3.

In certain embodiments, eNB 310 may further include a timing and control unit 360 and a core network interface unit 370, such as are shown in FIG. 3, each in communication with the other and with baseband processor 330. Timing and control unit 360 may monitor operations of baseband processor 330 and network interface unit 370, and may provide appropriate timing and control signals to these units. Network interface unit 370 may provide a bi-directional interface for eNB 310 to communicate with a core or back-end network (not shown) to facilitate administrative, data-management and/or call-management functions for mobile subscribers operating in the network through eNB 310.

In certain embodiments, base station 310 may include additional components responsible for providing additional functionality, including any of the functionality identified herein and/or any functionality necessary to support the techniques described herein. Although features and elements are described in particular combinations, each feature or element can be used alone without the other features and elements or in various combinations with or without one or more features and elements. Techniques provided herein may be implemented in a computer program, software, or firmware incorporated in a computer-readable storage medium (e.g., memory 334 in FIG. 3) for execution by a general purpose computer or a processor (e.g., processing unit 332 in FIG. 3). Examples of computer-readable storage media include read only memory (ROM), random access memory (RAM), digital registers, cache memory, semiconductor memory devices, magnetic media such as internal hard disks, magnetic tapes and removable disks, magneto-optical media, and optical media such as CDROM disks, digital versatile disks (DVDs), and so on. Such computer-readable storage media may be separate units, may be incorporated as part of one or more other units (e.g., processing unit 332 in FIG. 3), or may be a combination of separate and incorporated units.

Figure 4:
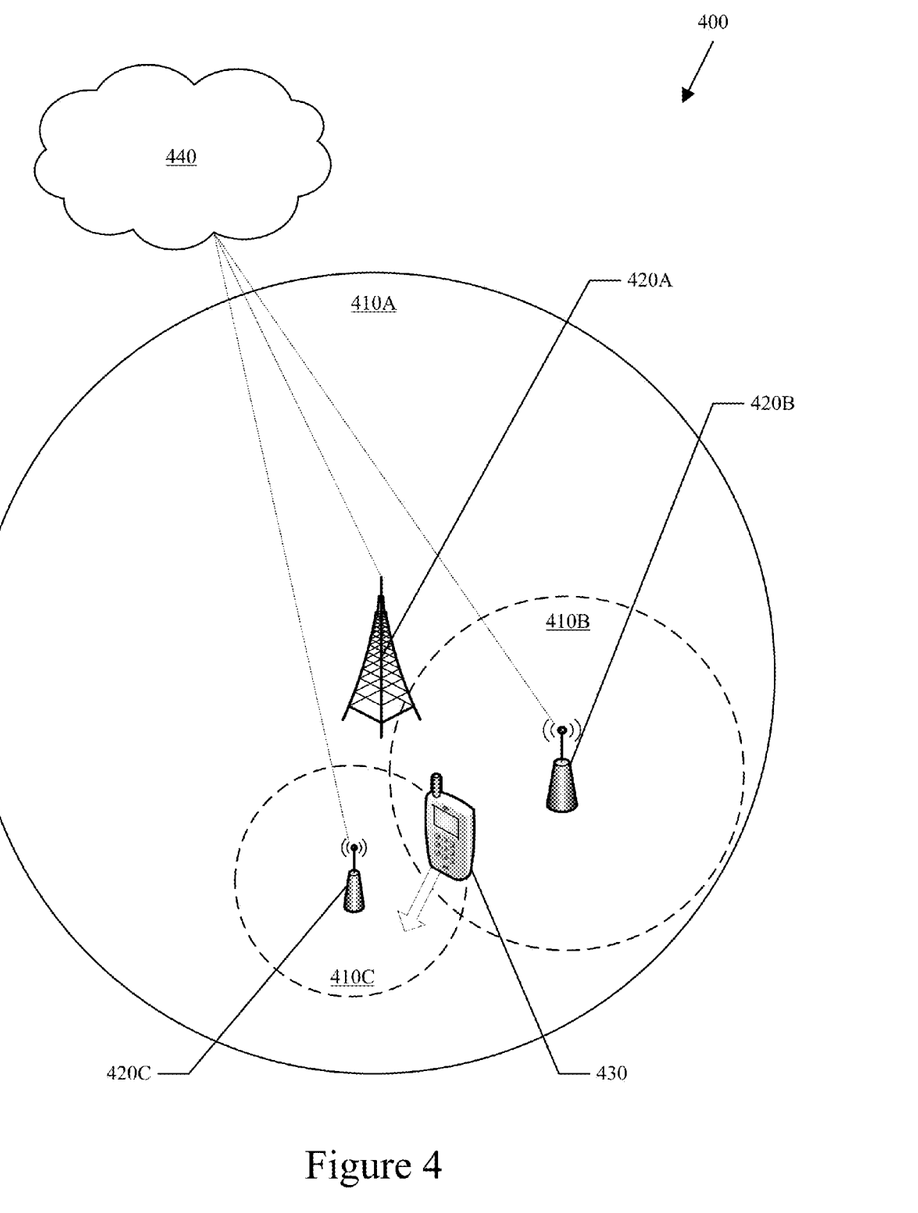
FIG. 4 illustrates an exemplary multi-RAT wireless network according to certain embodiments.

FIG. 4 illustrates an exemplary multi-RAT (radio access technology) wireless network 400 according to certain embodiments. As shown in FIG. 4, a mobile device (handset, UE, etc.) 430 is within the coverage area of multi-RAT wireless network 400. Multi-RAT wireless network 400 can include multiple-technology network coverage pieces. For example, one technology coverage area can be a cell 410A, such as in an LTE coverage area. Within (or partially within) cell 410A coverage area, there can concurrently exist one or more other technology coverage areas, for example cells 410B and 410C, each of which may be a GSM, UMTS, WiMAX, CDMA or even Wi-Fi coverage area. As shown, cells 410B, 410C are within cell 410A and at least partially overlap each other, although this configuration is for illustrative purposes only. Each cell 410 can also include some sort of network access device 420A, 420B and 420C, such as a base station, eNodeB or access point. Each network access device 420 can communicate with one or more mobile devices 430, as well as with a core network 440 (and even, perhaps, with each other). Not shown are possible intermediate network components or system elements that may be between each network access device 420 and core network 440. In certain embodiments, mobile device 430 can be moving within cell 410A and moving out of cell 410B and into cell 410C. In this way, mobile device 430 could possibly communicate with one or more of cells 410A, 410B and 410C.

As previously discussed, current generations and prior generations of wireless technologies might co-exist for a period of time as the current generations are implemented. In these situations, the current generation may be considered a higher priority technology than the prior generations, which may be considered lower priority technologies. Initially, for example, LTE has been implemented for data transfer only, without voice capability (i.e., without an IP multimedia subsystem for voice over IP capability). Thus, an LTE-capable handset (HS) or mobile device must fall back (FB) to a previous generation RAT, such as GSM or UMTS, to make a voice call. Using this CSFB technique, an LTE HS can make voice calls by reverting to traditional circuit switched communications.

Once a CSFB call has ended, the HS might be in a state that allows one or more applications (Apps) on the device to start or return to transferring data traffic while still on the lower priority network or technology, instead of first switching to a faster, more efficient or higher priority technology or network. For example, if the CSFB call is a UMTS call, once the call ends, the device might be in the UMTS cell-DCH ("dedicated channel") or cell-FACH ("forward access channel") state. While the mobile device is in either of these UMTS states, it may not scan for an LTE technology or a higher priority network, such as a high priority public land mobile network (PLMN), either of which might provide a user of the HS a faster and/or more efficient data traffic experience. Additionally, a mobile device might be connected (i.e., with an active radio link) in a lower priority network for any other reason, such as when roaming. In this situation, the device might be in a data traffic transfer state for one or more applications (Apps) that does not allow the device to scan for a higher priority technology or network, which might provide the user with a faster and/or more efficient data traffic experience.

Because there are more and more mobile device applications using data traffic, devices are likely to stay in or alternate between states on a lower priority technology or network for a long time and thus not switch back to a higher priority network or technology. Sometimes, the HS user may not even realize what is happening, because the data traffic could be initiated by one or more applications (Apps) running in the background of the device, potentially causing unnecessary delay in finding a higher priority technology or network.

In certain embodiments, the disclosed fast scan algorithm for higher priority technology or network search can select, for example, an LTE network or high priority public land mobile network (HPLMN) quickly (e.g., following a CSFB call, even with UMTS or GSM data traffic), while continuing to provide a good user experience. By using different events from the device, such as, for example, whether the display or screen is on or off and/or whether an App is running in the foreground or background, the device may suspend the data traffic of the lower priority technology or network state and scan (perhaps periodically, with backoff) for a higher priority network or technology. Moreover, based at least partially on other information, such as, for example, the current location versus the last location where the device had higher priority service, the current location versus the location of the last CSFB voice call initiation, the current location versus the location of the last higher priority technology or network scan, the device may further augment the scan and/or the backoff interval as disclosed in this application.

Figure 5:
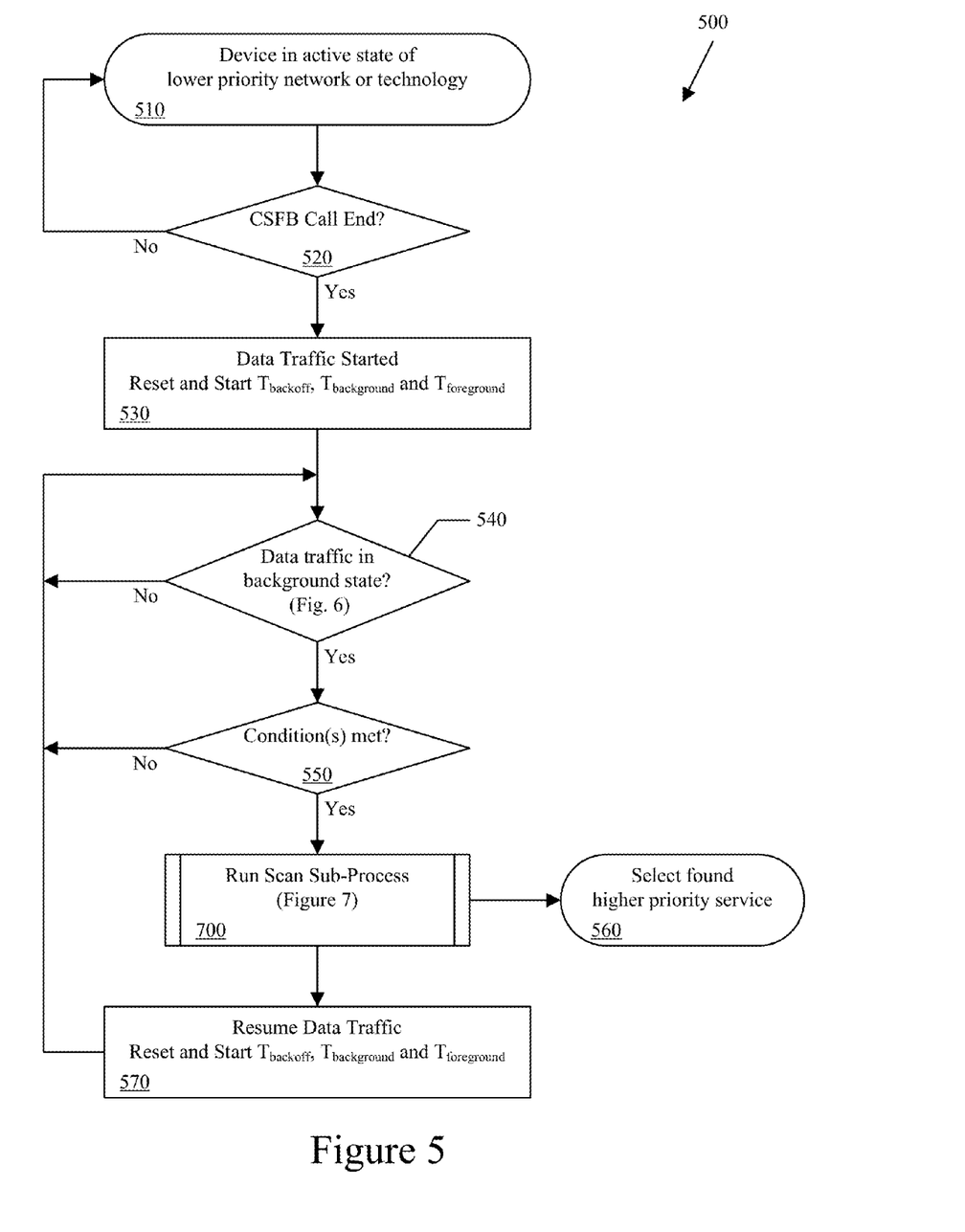
FIG. 5 illustrates an exemplary fast scan algorithm flow diagram for higher priority network or technology search according to certain embodiments.

FIG. 5 illustrates an exemplary fast scan algorithm flow diagram 500 for higher priority network or technology search according to certain embodiments. Flow diagram 500 is described with reference to LTE, GSM and UMTS. However, flow diagram 500 is intended to be more generally applicable as between any two or more networks or technologies, where a device might be "stuck" in a lower priority technology or network but desires to (or is desirable to) communicate in another higher priority network or technology. As shown in FIG. 5 at 510, a device, such as UE 210 or mobile device 430, is in an active state of a lower priority network or technology. For example, the device may be in a UMTS network and be communicating data traffic following a CSFB voice call from an LTE network. In this example, an active state might include UMTS cell-DCH, UMTS cell-FACH, GRPS Ready State, and the like. At 520, a check is made for whether the CSFB voice call has ended. If the CS call has not ended, then the flow can return to 510.

In certain embodiments, if the CSFB call has ended at 520, then at 530, the handset may start communicating data traffic while still not in a lower priority network or technology (e.g., UMTS). Additionally at 530, a backoff timer, $T_{backoff}$, can be reset and started. In addition to the backoff timer, a background timer, $T_{background}$, and a foreground timer, $T_{foreground}$, can be reset and started. Further description of these two timers is provided elsewhere in this application. Each timer may be a simple countdown timer or may be some other timing means, such as, registering a clock time at the beginning of the timed event and then predefining a threshold for the timed event that is compared to a subtraction of the beginning, registered clock time from a future clock time. Likewise, each timer in this disclosure can be a fraction or multiple of one or more base timers and/or one or more base thresholds used for all timers in this disclosure (i.e., such base timers may be one or more of the actual timers disclosed herein).

The backoff timer may be dynamically variable depending on certain device and/or network considerations, for example, for various Apps, mobility states, network configurations, RF conditions, and so on. The backoff timer, for example, may be set to approximately 120 seconds when there is little or no device mobility, or it may be approximately 30 seconds with very high device mobility. Of course, there are only example times and the actual backoff timer amount, as well as all other timer amounts, can depend on design considerations and might be any desired value (e.g., any value between zero and infinity). Additionally, in certain embodiments, the backoff timer can be dynamically adjusted based on the quality of service (QOS) needs or parameters of the device and/or the applications (Apps) running on the device. For example, if simple text browsing is occurring on the device, then the QOS needs may be lower and a longer backoff timer can be set. Likewise, if data-intensive gamine is occurring on the devise, then the QOS needs may be higher and a shorter backoff timer can be set. Similarly, the backoff timer can be dynamically adjusted based on other device and/or network parameters, such as, for example, which Apps are running on the device, the mobility state of the device, the power reserve of the device, and so on.

Figure 6:
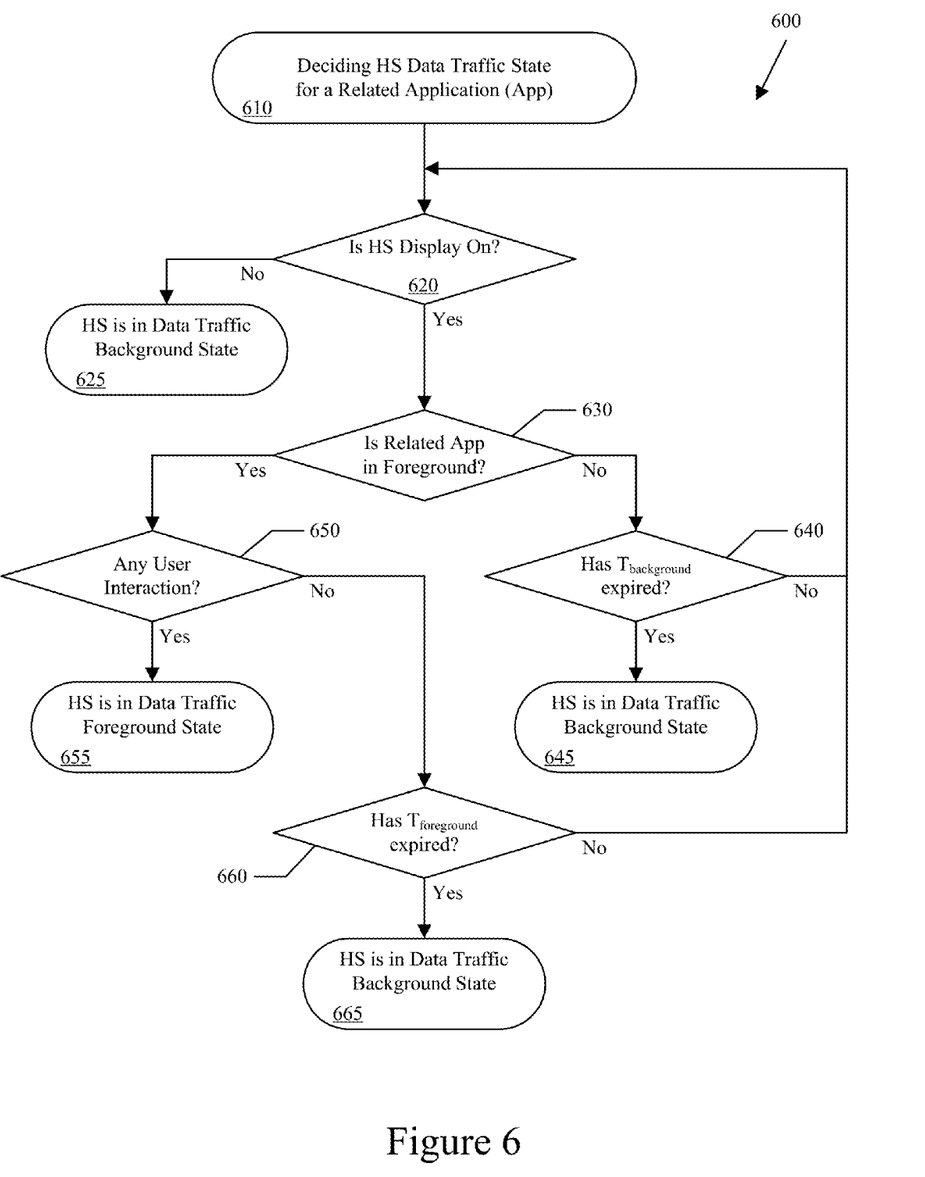
FIG. 6 illustrates an exemplary data traffic state determination flow diagram according to certain embodiments.

At 540, a check can be made to determine whether the HS data traffic to/from the device for an App is running in a data traffic background state (as provided in more detail with reference to FIG. 6, below). If the App is not running in the data traffic background state, then the flow can return to 540 to perform the check again. However, if the App is running in the data traffic background state, then the flow continues to 550. FIG. 6 illustrates an exemplary data traffic state determination flow diagram 600 according to certain embodiments. Data traffic state determination flow diagram 600 can, for example, be used at 540 of FIG. 5. As shown in FIG. 6 at 610, flow 600 can be used to determine the HS data traffic state for one or more applications (Apps) related to the ongoing device data traffic while on the lower priority network or technology. At 620, a check can be made to determine whether the HS display or screen is on. If the HS display is not on, then at 625 the HS is determined to be in the data traffic background state. If the HS display is on, then at 630 a check can be made to determine whether the related App (i.e., the App related to the ongoing device data traffic) is running in the foreground.

In certain embodiments, from 630 of FIG. 6, if the related App is not running in the foreground, then at 640 a check can be made to determine whether the background timer, $T_{background}$, has expired. If the background timer has expired, then at 645 the HS is determined to be in the data traffic background state. If the background timer has not expired, then the flow can return to 620. From 630, if the related App is running in the foreground, then at 650, a check can be made to determine whether the related App requires any use interaction. User interaction, for example, can include a key press, a screen or display touch, a menu item selection, data entry, control change and so on. If the related App does require user interaction, then at 655 the HS is determined to be in the data traffic foreground state. That is, if the ongoing traffic data is generated by a related App that actively requires user interaction, then the device should not suspend the data traffic to trigger a network scan. If the related App does not require any user interaction, then at 660 a check can be made to determine whether the foreground timer, $T_{foreground}$, has expired. If the foreground timer has expired, then at 665 the HS is determined to be in the data traffic background state. If the foreground timer has not expired, then the flow can return to 620.

As shown in FIG. 6, two timers can be used, a background timer and a foreground timer. The background timer can be used to indicate a minimum amount of time that the related App must be running in the background (i.e., not in the foreground, as checked at 630) before the determination is made that the HS is in the data traffic background state. For example, the background timer might be approximately 5-6 seconds. The foreground timer can be used to indicate a minimum amount of time that a related App running in the foreground (i.e., as checked at 630) must not require user interaction before the determination is made that the HS is in the data traffic background state. For example, the foreground timer might be approximately 30-40 seconds. However, as previously mentioned, both of these timers can be simple countdown timers or some other timing means, for example, that may involve using a threshold measurement, and each can depend on design considerations and might be any desired value (e.g., any value between zero and infinity). Likewise, each timer in this disclosure can be a fraction or multiple of one or more base timers and/or one or more base thresholds used for all timers in this disclosure (i.e., such base timers by also be one or more of the actual timers disclosed herein).

Returning to FIG. 5 at 540, if the determination is made that the HS is not in the data traffic background state, then the flow can return to 540. However, if the determination is made that the HS is in the data traffic background state, then at 550 a check can be made to determine whether one or more conditions have been met. The one or more conditions at 550 can include, for example, one or more of: whether the backoff timer has expired, whether the current HS location has changed a certain amount relative to the last location the device had higher priority service (e.g. LTE or HPLMN service), whether the current HS location has changed back to the last location the device had higher priority service, whether the current location has changed a certain amount relative to the location where the last CSFB voice call was initiated, whether the current location has changed back to the location where the last CSFB voice call was initiated, and whether the current location has changed a certain amount relative to the location of the last higher priority service scan. These are only a few examples of conditions that may be used at 550. Those skilled in the art will appreciate the myriad of conditions that are meant to be included within the scope of this application. The one or more conditions may be used separately or in combination to satisfy the check at 550.

In certain embodiments, if at 550 the conditions are not met, then the flow can return to 540. If the conditions are met at 550, then at 700, flow 500 runs a scan sub-process (discussed in more detail with reference to FIG. 7 elsewhere in this application). If the result of scan sub-process 700 is a found higher priority network or technology (e.g., an LTE network or an HPLMN), then at 560 the HS can select the found higher priority network or technology, after which data traffic may be resumed. If the result of scan sub-process 700 is that no higher priority network or technology is found, then at 570 the HS can resume data traffic on the lower priority service and reset and start the backoff timer, background timer and foreground timer, after which the flow can return to 540.

Figure 7A:
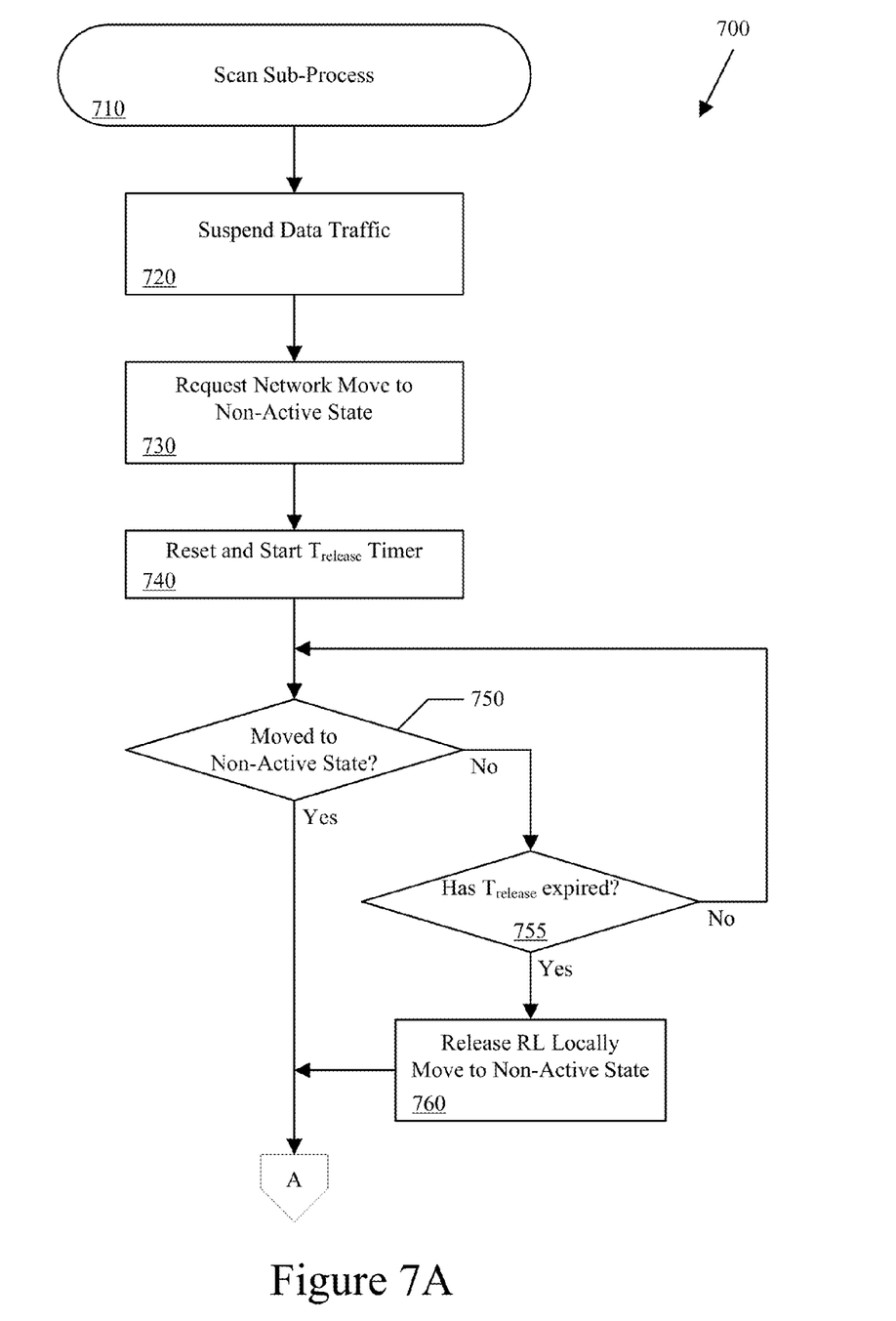
FIGS. 7A and 7B (together, FIG. 7) illustrate an exemplary fast scan algorithm sub-process flow diagram 700 according to certain embodiments.
Figure 7B:
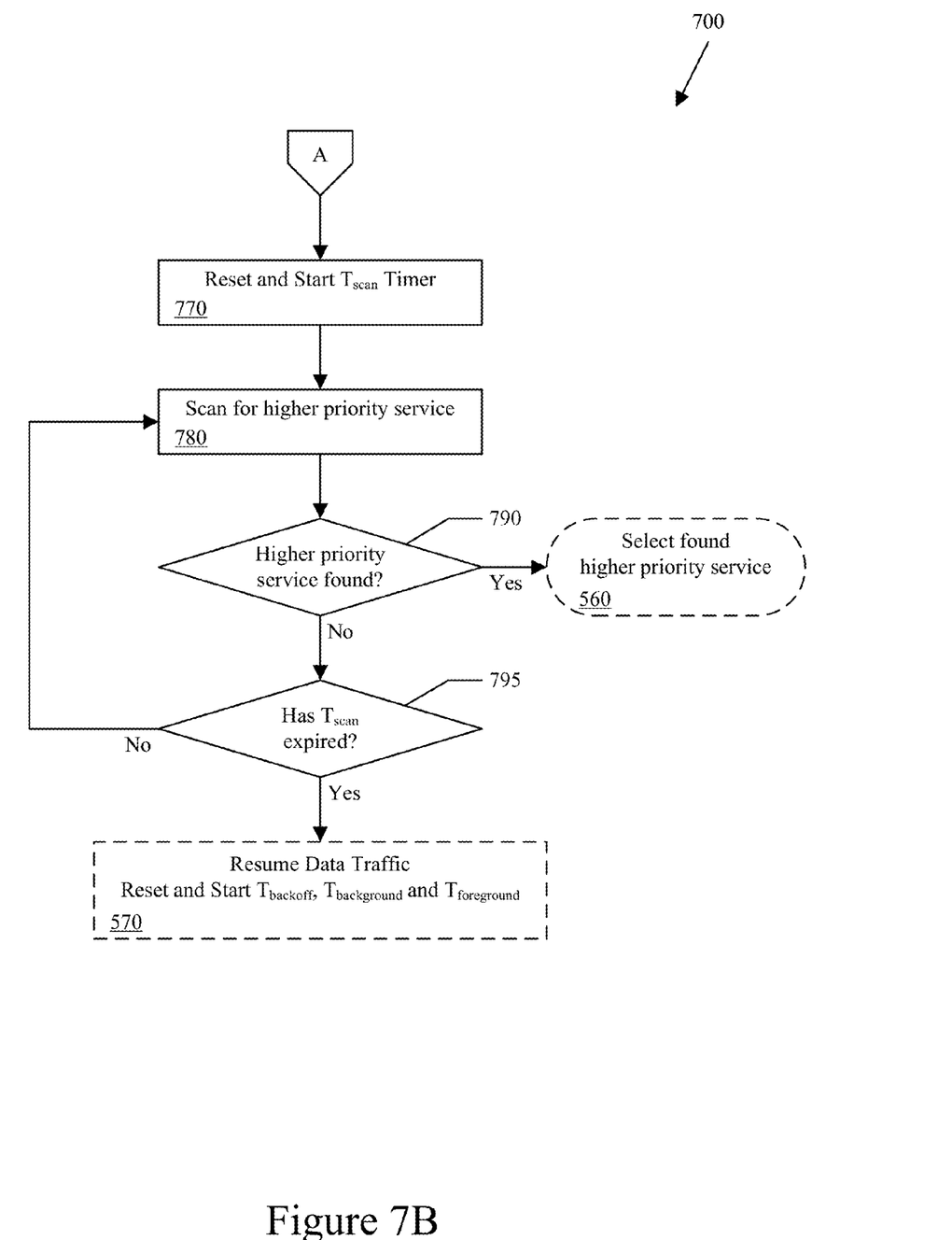

FIGS. 7A and 7B (together, FIG. 7) illustrate an exemplary fast scan algorithm sub-process flow diagram 700 according to certain embodiments. As shown in FIG. 7 at 710, the scan sub-process begins, which happens after the HS is determined to be in the data traffic background state at 550 of FIG. 5. At 720, the mobile device can suspend the data traffic happening on the lower priority network (e.g., GSM or UMTS). For example, the device can stop transmitting data traffic in the uplink (UL) and can acknowledge (ACK) the received downlink (DL) data traffic. At 730, the HS can request that the lower priority network move the device to a non-active state, such UMTS cell-PCH, UMTS URA-PCH, UMTS Idle, GPRS Standby, GPRS Idle, and so forth. For example, if in a UMTS network, the device can trigger fast dormancy by sending a signaling connection release indication (SCRI) message and waiting for the network to move it to a non-active state. Or, for example, if in a GPRS network, the HS can initiate a release of the temporary block flow (TBF) and wait to move to a non-active state.

In certain embodiments, at 740, a release timer, $T_{release}$, can be reset and started. As with other timers discussed in this application, the release timer can be a simple countdown timer or some other timing means, for example, that may involve using a threshold measurement, and can depend on design considerations and might be any desired value (e.g., any value between zero and infinity). Likewise, each timer in this disclosure can be a fraction or multiple of one or more base timers and/or one or more base thresholds used for all timers in this disclosure (i.e., such base timers by also be one or more of the actual timers disclosed herein). The release timer can indicate a length of time the HS must wait for the network to move the device to a non-active state before continuing on its own. For example, the release timer can be approximately 2-3 seconds. At 750, a check can be made to determine whether the HS has been moved to a non-active state. If the HS has not been moved to a non-active state, then at 755 a check can be made to determine whether the release timer has expired. If the release timer has not expired, then the flow can return to 750. If at 755 the release timer has expired, then at 760 the HS can drop or release the active radio link (RL) locally and move itself to a non-active state.

In certain embodiments, if at 750 or at 760 the HS has moved to a non-active state, then at 770, a scan timer can be reset and started. As with other timers discussed in this application, the scan timer can be a simple countdown timer or some other timing means, for example, that may involve using a threshold measurement, and can depend on design considerations and might be any desired value (e.g., any value between zero and infinity). Likewise, each timer in this disclosure can be a fraction or multiple of one or more base timers and/or one or more base thresholds used for all timers in this disclosure (i.e., such base timers by also be one or more of the actual timers disclosed herein). Scan timer can indicate a maximum desired length of time the HS will can for a higher priority network or technology (e.g., an LTE network or HPLMN) while keeping the data traffic suspended on the lower priority service. For example, the scan timer can be approximately 5 seconds.

With the scan timer running, then at 780 the mobile device can scan for a higher priority network or technology (e.g., an LTE network or HPLMN). This scan, for example, can be performed in the background. In certain embodiments, during the higher priority service scan, the HS can ignore any data traffic request that is not initiated by a user, but can abort the scan for CS voice call requests (whether user or network initiated) or for new data traffic requests that are initiated by the user (e.g., with user interaction, for example like a key press, a display touch, a voice command, etc.). At 790 a check can be made to determine whether a higher priority network or technology has been found. If a higher priority service has been found, then at 560 of FIG. 5 the found higher priority service can be selected. If at 790 a higher priority network or technology has not been found, then at 795 a check can be made to determine whether the scan timer has expired. If the scan timer has not expired, then the flow can return to 780 and the scan continues. If the scan timer has expired, then at 570 of FIG. 5, the HS can resume data traffic on the lower priority service and reset and start the backoff timer, background timer and foreground timer, after which the flow can return to 540 of FIG. 5.

It will be appreciated by those skilled in the art that the techniques embodied in this application can be used to scan from any lower priority RAT or network (e.g. GPRS/EDGE, GSM, CDMA, WiMAX, Wi-Fi, LTE, etc.) to find a higher priority or higher throughput network or technology, such as LTE or LTE-Advanced service. All such configurations and embodiments are intended to be included within the scope of this application.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints or preferences imposed on the overall system. Skilled artisans may implement the described functionality in varying ways for each particular application, but such implementation decisions should not be interpreted as causing a departure from the scope of the disclosure.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in one or more software modules executed by one or more processing elements, or in a combination of the two. A software module may reside in RAM memory, flash memory, ROM memory, EPROM memory, EEPROM memory, registers, hard disk, a removable disk, a CD-ROM, or any other form or combination of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and more elements may be added.

What is claimed is:

1. A method for wireless communication, comprising:
performing, by a wireless device:
  operating in an active state of communicating data traffic on a lower priority network;
  determining a data traffic state of the wireless device, wherein said determining determines that the wireless device is in a data traffic background state in response to:
    determining whether one or more applications involved in ongoing data traffic are running in the foreground; and
    a) if the one or more applications of the wireless device are not running in the foreground, determining that a predetermined background time period has passed, during which the one or more applications are executing in the background; or
    b) if the one or more applications are running in the foreground, determining that no user interaction is required by the one or more applications, and that a predetermined foreground time period has passed; and
  searching for a higher priority network in response to determining that the wireless device is in the data traffic background state, wherein the searching for a higher priority network comprises:
    scanning for the higher priority network during a predetermined scan period;
    determining whether the higher priority network is found during the predetermined scan period;
    if the higher priority network is found during the predetermined scan period, selecting the higher priority network; and
    if the higher priority network is not found during the predetermined scan period, restarting at least one of the predetermined background time period and the predetermined foreground time period.

2. The method of claim 1,
wherein said determining the data traffic state determines that the wireless device is in a data traffic foreground state;
wherein said searching for a higher priority network is not performed in response to determining that the wireless device is in the data traffic foreground state.

3. The method of claim 2,
wherein said determining the data traffic state determines that the wireless device is in a data traffic foreground state in response to determining that the one or more applications are running in the foreground and that user interaction has been received by the one or more application.

4. The method of claim 2,
wherein said determining the data traffic state determines that the wireless device is in a data traffic foreground state in response to determining that the one or more applications are running in the foreground, that user interaction has not been received by the one or more applications, and that the predetermined foreground time period has not passed.

5. The method of claim 2,
wherein said determining the data traffic state determines that the wireless device is in a data traffic foreground state in response to determining that the one or more applications are running in the background and that the predetermined background time period has not passed.

6. The method of claim 1, further comprising:
determining if a display of the wireless device is turned on;
wherein said determining the data traffic state of the wireless device is performed in response to determining that the display of the wireless device is turned on.

7. The method of claim 1, further comprising:
starting one or more of the predetermined background time period or the predetermined foreground time period in response to determining that that the wireless device is in the active state of communicating data traffic on the lower priority network.

8. The method of claim 1,
wherein said searching for a higher priority network is performed in response to determining that the wireless device is in the data traffic background state and that a predetermined backoff time period has passed since the method last executed.

9. The method of claim 1,
wherein the searching for a higher priority network is performed in response to determining that the wireless device is in the data traffic background state and that a current location of the wireless device has changed sufficiently according to one or more conditions;
wherein the one or more conditions include one or more of the following:
whether the current location has changed a first amount relative to a prior location where the wireless device had higher priority service;
whether the current location has changed back to a prior location of the wireless device;
whether the current location has changed a second amount relative to a first location where a CS fallback (CSFB) voice call was initiated by the wireless device;
whether the current location has changed back to the first location; and
whether the current location has changed a third amount relative to a search location where a last higher priority network search occurred.

10. A wireless device for wireless communication, comprising:
at least one antenna; and
one or more processors coupled to the at least one antenna and configured to:
determine that the wireless device is in an active state of communicating data traffic on a lower priority network;
determine that the wireless device is in a data traffic background state, wherein said determining is based on determining that one or more applications on the device are not running in the foreground and that a predetermined background time period has passed, during which the one or more applications are executing in the background; and
search for a higher priority network in response to determining that the wireless device is in the data traffic background state, wherein, in searching for a higher priority network, the one or more processors are configured to:
scan for the higher priority network during a predetermined scan period;
determine whether the higher priority network is found during the predetermined scan period;
if the higher priority network is found during the predetermined scan period, select the higher priority network; and
if the higher priority network is not found during the predetermined scan period, restart the predetermined background time period.

11. The wireless device of claim 10, wherein, in searching for the higher priority network, the one or more processors are configured to:
suspend the data traffic on the lower priority network at the wireless device;
move the wireless device to a non-active state after said suspending; and
search for the higher priority network after said suspending and said moving.

12. The wireless device of claim 11, wherein, in moving the wireless device to a non-active state, the one or more processors are configured to:
request that the lower priority network move to the non-active state after suspending the data traffic on the lower priority network;
after requesting that the lower priority network move to the non-active state, determine whether the lower priority network move has occurred prior to expiration of a release timer period;
if the lower priority network move has not occurred prior to expiration of the release timer period, release a local lower priority network radio link; and
move the wireless device to the non-active state in response to either the lower priority network move having occurred or the lower priority network radio link being released.

13. The wireless device of claim 11, wherein, in searching for a higher priority network, the one or more processors are configured to:
if the higher priority network is not found during the predetermined scan period, resume the data traffic on the lower priority service.

14. A wireless device for wireless communication, comprising:
at least one antenna; and
one or more processors coupled to the at least one antenna and configured to:
determine that a wireless device is in an active state of communicating data traffic on a lower priority network;
determine that the wireless device is in a data traffic background state, wherein said determining is based on determining that the one or more applications on the device are running in the foreground, that no user interaction is required by the one or more applications, and that a predetermined foreground time period has passed while the one or more applications are executing in the foreground; and
search for a higher priority network in response to determining that the wireless device is in the data traffic background state, wherein, in searching for a higher priority network, the one or more processors are configured to:
scan for the higher priority network during a predetermined scan period;
determine whether the higher priority network is found during the predetermined scan period;
if the higher priority network is found during the predetermined scan period, select the higher priority network; and
if the higher priority network is not found during the predetermined scan period, restart the predetermined foreground time period.

15. The wireless device of claim 14, wherein the one or more processors are configured to:
determine if a display of the wireless device is turned on;
wherein said determining the data traffic state of the wireless device is performed in response to determining that the display of the wireless device is turned on.

16. The wireless device of claim 14, wherein the one or more processors are configured to:
start one or more of a predetermined background time period or the predetermined foreground time period in response to determining that that the wireless device is in the active state of communicating data traffic on the lower priority network.

17. The wireless device of claim 14, wherein the one or more processors are configured to:
prior to searching for a higher priority network, determine that the wireless device has been in the data traffic background state for at least a predetermined backoff time period since the device previously searched for a higher priority network.

\* \* \* \* \*